United States Patent
Garner et al.

(10) Patent No.: US 11,653,187 B1
(45) Date of Patent: May 16, 2023

(54) POWER MONITORING OF DEVICES

(71) Applicant: Roku, Inc., San Jose, CA (US)

(72) Inventors: Gregory Mack Garner, San Jose, CA (US); David Stern, San Jose, CA (US); David Westerhoff, San Jose, CA (US); Anthony John Wood, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/565,803

(22) Filed: Dec. 30, 2021

(51) Int. Cl.
*G06F 1/28* (2006.01)
*H04W 4/38* (2018.01)
*H04L 67/025* (2022.01)
*H04L 67/12* (2022.01)

(52) U.S. Cl.
CPC ............. *H04W 4/38* (2018.02); *H04L 67/025* (2013.01); *H04L 67/12* (2013.01)

(58) Field of Classification Search
CPC ......... H04W 4/38; H04L 67/025; H04L 67/12
See application file for complete search history.

(56) References Cited

U.S. PATENT DOCUMENTS

| | | | |
|---|---|---|---|
| 2012/0197448 A1* | 8/2012 | Shin | G01D 4/02 700/286 |
| 2015/0112763 A1* | 4/2015 | Goldschneider | G06Q 30/0202 705/7.31 |
| 2016/0128158 A1* | 5/2016 | Harder | H05B 45/20 315/308 |
| 2016/0170463 A1* | 6/2016 | Agrawal | G06F 1/28 713/310 |
| 2016/0291671 A1* | 10/2016 | Rider | G06F 1/3209 |

* cited by examiner

*Primary Examiner* — Walli Z Butt
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for a device including a functional circuit, a power monitor circuit, and a controller. The functional circuit can be configured to perform a function. The power monitor circuit can collect power usage data of the functional circuit. The controller can transmit the power usage data to a master control device, and receive an instruction provided by the master control device. The instruction is generated based on the power usage data of the functional circuit and related to the function. Based on the instruction received from the master control device, the controller can adjust the function performed by the functional circuit.

20 Claims, 5 Drawing Sheets

POWER MONITORING OF DEVICES

FIELD

This disclosure is generally directed to power monitoring and management of devices.

BACKGROUND

Power management in various applications can be an important and challenging issue. Internet-enabled devices, such as Internet of things (IoT) devices, are deployed in growing numbers and may grow to multibillions in the near future. Power management concerns can be particularly important for the large number of IoT devices, deployed to perform their designed functions over extended periods. Therefore, new developments in power management are needed to mitigate power management costs.

SUMMARY

Provided herein are system, apparatus, article of manufacture, method and/or computer program product embodiments, and/or combinations and sub-combinations thereof, for a computing device having a functional circuit to perform its function, and a power monitor circuit to collect power usage data of the functional circuit, which can be used to adjust its function based on the power usage data. Accordingly, the computing device can maintain its function while preserving power consumption. Embodiments can be applied to any computing device such as Internet of things (IoT) devices where power efficiency plays an important role.

An example embodiment of a device can include a functional circuit, a power monitor circuit coupled to the functional circuit, and a controller coupled to the power monitor circuit and the functional circuit. The functional circuit can be configured to perform a function. The power monitor circuit can collect power usage data of the functional circuit. The controller can transmit the power usage data to a master control device, and receive an instruction provided by the master control device. The instruction is generated based on the power usage data of the functional circuit and related to the function. Based on the instruction received from the master control device, the controller can adjust the function performed by the functional circuit.

In some embodiments, a master control device can receive from a device, power usage data of the device, where the power usage data are collected by a power monitor circuit of the device based on a function performed by a functional circuit of the device. Based on the received power usage data, the master control device can generate an instruction related to the function performed by the functional circuit of the device, and transmit the instruction to the device to adjust the function performed by the functional circuit of the device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
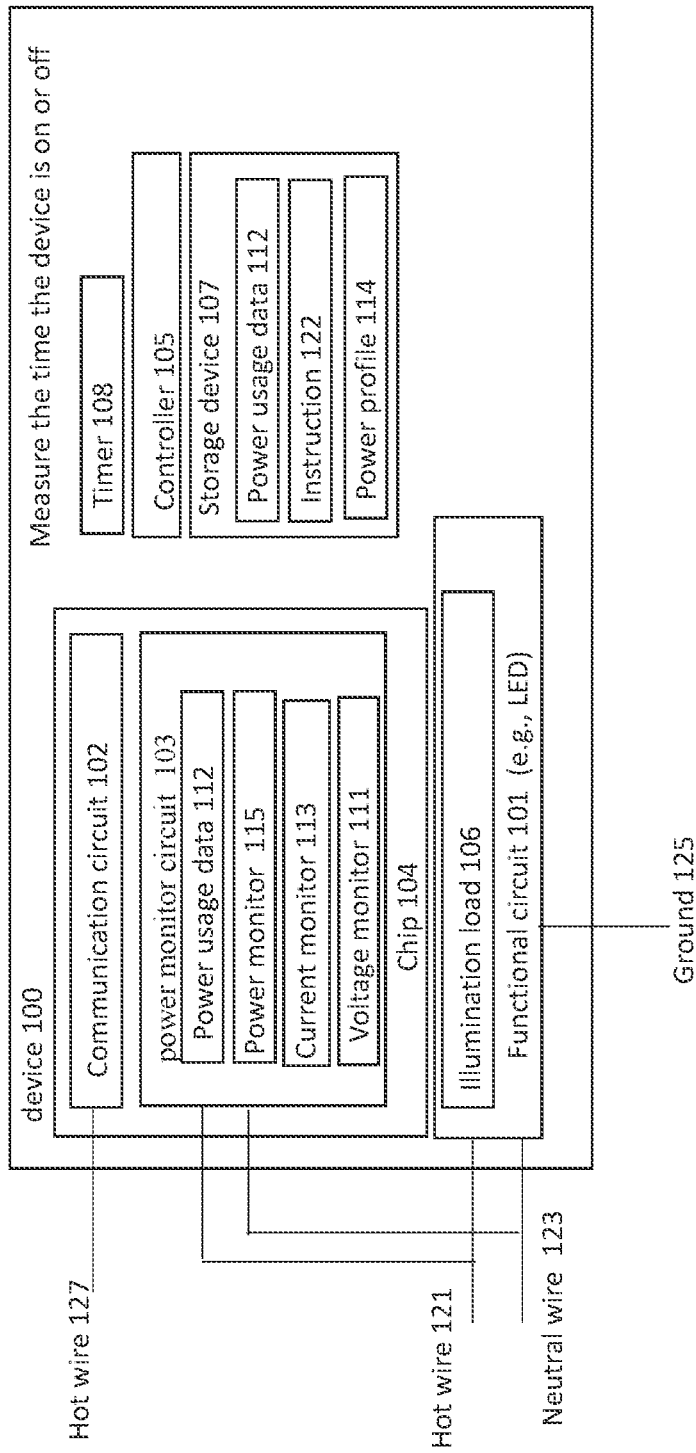
FIG. 1 illustrates an example device that including a functional circuit and a power monitor circuit to collect power usage data of the functional circuit, according to some embodiments.

Devices, which may be referred by various names such as computing devices, electronic devices or semiconductor devices, play important roles in the daily life. Internet of things (IoT) devices are computing devices that connect wirelessly to a network and have the ability to transmit data to other devices such as a master control device or a peer device. IoT devices extend internet connectivity beyond standard devices, such as desktops, laptops, smartphones and tablets, to any range of traditionally "dumb" or non-internet-enabled physical devices and everyday objects. In some embodiments, IoT devices can communicate and interact over the internet, and be remotely monitored and controlled. In some other embodiments, IoT devices can be connected and controlled locally, for example, over a local area network coupled to a network hub.

A device may include various components, such as a functional circuit and a communication circuit, where the functional circuit performs the functions the device is designed for, and the communication circuit enables the device to communicate within a network. For example, when a device is a light emitting diode (LED) light, the functional circuit is the part of the circuit of the LED light that provides power and emit the light. A device may be any device that includes a functional circuit and a communication circuit, such as a standard computing device, an IoT device, or other devices.

Power consumption and management are an important aspect of a device, such as an IoT device. Some of the IoT devices may be powered by a battery, where a long battery life is important. Such devices may include IoT devices used in applications such as oil and gas, agriculture, health care, wildlife conservation, forestry, water monitoring, and others.

An example embodiment presents a computing device that can include a power monitor circuit coupled to the functional circuit, and configured to collect power usage data of the functional circuit. Such a power monitor circuit may not exist in a traditional device, such as a traditional IoT device. In addition, a device may include a controller coupled to the power monitor circuit and the functional circuit to control the power consumption by adjusting the function of the device. Such a controller may be different from a processor that is included in the device to perform the function, which may be a part of the functional circuit. The controller may transmit the power usage data to a master control device, and receive an instruction provided by the master control device. The instruction may be generated based on the power usage data of the functional circuit and related to the function. Based on the instruction received from the master control device, the controller can further adjust the function performed by the functional circuit. For example, to adjust the function of a LED light, the LED light may be turned off, or dimmed to be less bright.

In some embodiments, the power usage data collected by the power monitor circuit may be in various forms. The power usage data may be different from a utility power metering data for the device, which may be the base for a user to pay for the power usage and hence more accurate than the power usage data collected by the power monitor circuit. In some embodiments, the power usage data may be estimated based on a power profile of the functional circuit stored in a storage device, and a timer to measure an amount of time the functional circuit performs the function. The power usage data can be estimated based on the amount of time and the power profile. The power usage data may include a voltage or a current of the functional circuit, an apparent power, an active power, a reactive power, a power factor, an overcurrent, an over voltage, an under voltage, or any other power parameters.

Various embodiments of this disclosure may provide a master control device, which can receive power usage data from a device, where the power usage data are collected by a power monitor circuit of the device based on a function performed by a functional circuit of the device. Based on the received power usage data, the master control device can generate an instruction related to the function performed by the functional circuit of the device, and transmit the instruction to the device to adjust the function performed by the functional circuit of the device. Accordingly, the power consumption of the device may be adjusted based on the adjusted function performed by the device.

FIG. 1 illustrates an example device 100 including a functional circuit 101 and a power monitor circuit 103 to collect power usage data of the functional circuit, according to some embodiments. It is noted, however, that device 100 is provided solely for illustrative purposes, and is not limiting. Embodiments of this disclosure may be implemented using and/or may be part of device different from and/or in addition to device 100, as will be appreciated by persons skilled in the relevant art(s) based on the teachings contained herein. An example of device 100 shall now be described.

In some embodiments, device 100 may be a cellular phone, a smart phone, a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device, a biometric sensor, a wearable device, an entertainment device, a vehicular component, a smart meter, an industrial manufacturing equipment, a global positioning system device, an Internet-of-Things (IoT) device, a machine-type communication (MTC) device, or an evolved or enhanced machine-type communication (eMTC) device, a smart TV, a smart speaker, a toy, a smart appliance, or any other computing device.

When device 100 is an IoT device, it may have various functions. Device 100 may be a physical object designed to interact with the real world in some way. Device 100 might be a sensor on an assembly line or an intelligent security camera. In either case, device 100 can sense what's happening in the physical world. Device 100 itself can include an integrated central processing unit (CPU), network adapter and firmware. In some cases, device 100 may acquire an internet protocol (IP) address that device 100 can use to function on the network. Some IoT devices are directly accessible over the public internet, but some other IoT devices are designed to operate exclusively on private networks.

In some embodiments, device 100 can include functional circuit 101, power monitor circuit 103, a controller 105, and a communication circuit 102, all coupled to each other. In addition, device 100 can include a storage device 107 and a timer 108. Device 100, such as functional circuit 101, may be wired or coupled to power sources through a hot line 121, a neutral line 123, and a ground line 125. In some embodiments, device 100 may include a second hot line 127. Device 100 may include some other additional circuits or components not shown in FIG. 1. For example, device 100 may include other circuit to perform security function such as device authentication/authorization, device registration and activation, device configuration, device firmware updates, diagnostics, troubleshooting, which are not shown.

In some embodiments, power monitor circuit 103 may be coupled to hot line 121 and neutral line 123, which are also coupled to functional circuit 101. Power monitor circuit 103 may be different from functional circuit 101. Without power monitor circuit 103, device 100 may perform the desired function by functional circuit 101 for a user. However, without functional circuit 101, device 100 may not perform the desired function for the user.

In some embodiments, functional circuit 101 may perform a function, which may be the intended function of device 100. Power monitor circuit 103 may collect power usage data 112 of functional circuit 101. Storage device 107 may store the collected power usage data 112. Controller 105 may transmit the power usage data 112 to a master control device, and receive an instruction provided by the master control device. Controller 105 may transmit the power usage data 112 or receive the instruction through communication circuit 102. Controller 105 may further adjust the function performed by functional circuit 101 based on the instruction received from the master control device. In some embodiments, the received instruction is to turn off functional circuit 101, and controller 105 can turn off functional circuit 101.

In some embodiments, device 100 may be a light emitting diode (LED) light, and functional circuit 101 may be configured to provide power to the LED light. For example, functional circuit 101 may include an illumination load 106 controlled by a dimmer device. In some embodiments, illumination load 106 can include an incandescent light, a halogen light, a metal halide light, a fluorescent light, a light emitting diode (LED) light, or a red, blue and green (RGB) LED light. An LED light can have LED elements as a light source. The LED elements can be dimmed to low illuminance compared to fluorescent lamps. The LED light is used as an example only, and device 100 may be any computing device. Functional circuit 101 may be named as a circuit, but may also include a general purpose processor, and/or a combination of custom circuits and general programmable devices. In some other embodiments, controller 105 may adjust the function performed by functional circuit 101 by changing the duration, intensity, degree of the functions performed. In some embodiments, controller 105 may control and adjust a dimmer switch to control the brightness of a LED light, which is an example of adjusting the function of functional circuit 101. Other ways to adjust the function of functional circuit 101 can be performed. For example, when device 100 is a camera, controller 105 may adjust the picture resolution, the size of the image taken by the camera, or the frequency of the photos taken by the camera to adjust the function of functional circuit 101 in order to save power.

In some embodiments, power monitor circuit 103 may include various component to collect different kinds of parameters related to power usage of functional circuit 101 or device 100. For example, power monitor circuit 103 may include a voltage monitor 111 to monitor a voltage (V) of functional circuit 101, a current monitor 113 to monitor a current (I) of functional circuit 101, or a power monitor 115 to monitor power (W) of functional circuit 101. The power usage data 112 may be different from a utility power metering data for device 100, which may be the base for a user to pay for the power usage and hence more accurate than the power usage data 112 collected by power monitor circuit 103. In some embodiments, the power usage data 112 may be estimated based on a power profile 114 of functional circuit 101 stored in storage device 107. Power profile 114 may be based on the design parameters of device 100. Timer 108 may measure an amount of time functional circuit 101 performs the function. The power usage data 112 can be estimated based on the amount of time and the power profile 114. By using such an estimation, power monitor circuit 103 may not perform an accurate monitoring of the power consumption of functional circuit 101. For example, comparing to an exact power usage, power usage data 112 can have an error within a range of about 1%. In comparison, a power consumption reported by a utility power metering can have an error around 0.1%. By doing power estimation in an accuracy less than the utility power metering level, power monitor circuit 103 can consume less power in performing the power monitoring. Often device 100 may be powered by a battery with a limited amount of power. When power monitor circuit 103 uses less power to perform a less accurate power estimation, more power can be used for functional circuit 101 to perform the function intended by device 100.

In some embodiments, power usage data 112 can include power usage by functional circuit 101 in addition to device power, where device power can include power being used by the power supply of controller 105 and other related circuitry that is not going to the load or the intended function of device 100. In some embodiments, power usage data 112 can include the power being used by all the circuit within device 100, including power being used by power monitor circuit 103.

In some embodiments, power usage data 112 may include a voltage or a current of the functional circuit, an apparent power, an active power, a reactive power, a power factor, an overcurrent, an over voltage, an under voltage, or any other power parameters. Accordingly, the different power usage data collected by power monitor circuit 103 depends on a tradeoff between the accuracy of power usage data and the energy consumption by power monitor circuit 103. The more accurate power usage data to be collected, power monitor circuit 103 may consume more power in collecting such accurate power usage data.

In some embodiments, communication circuit 102 and power monitor circuit 103 may be on a single chip, such as implemented by a system on chip (SoC) technology. The SoC technology is in contrast to the common traditional motherboard-based architecture, which separates components based on function and connects them through a central interfacing circuit board. By integrating communication circuit 102 and power monitor circuit 103 on a single chip, device 100 can have improved performance and reduced power consumption as well as semiconductor die area than multi-chip designs with equivalent functionality. Currently, a power monitor circuit may be separated from the communication circuit, and assembled together using a printed circuit board (PCB). Communications between the power monitor circuit and the communication circuit can be slower and consume more power than integrating them together on a SoC.

Figure 2:
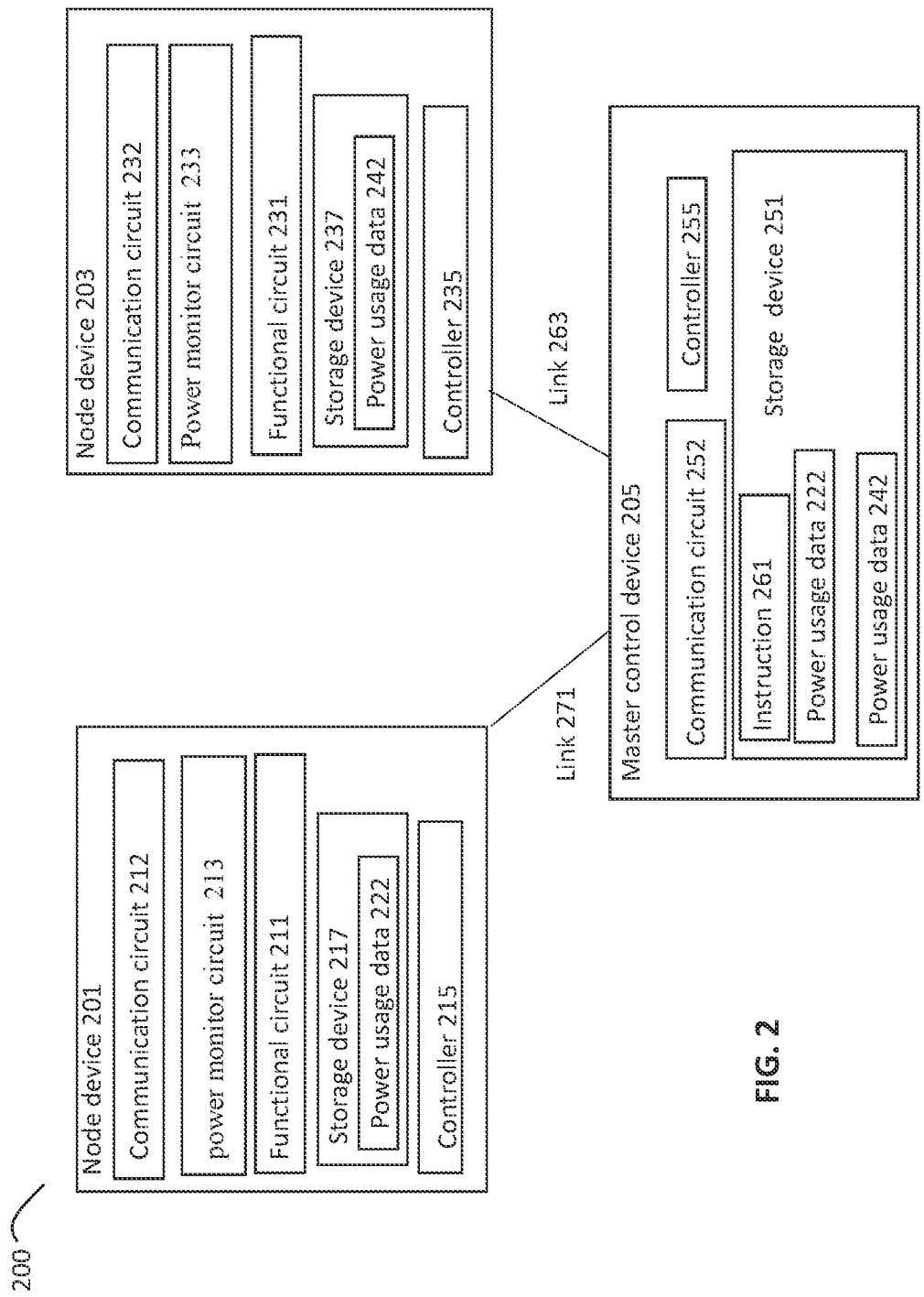
FIG. 2 illustrates an example master control device communicating with a plurality of devices to monitor the power consumption of the plurality of devices, according to some embodiments.

FIG. 2 illustrates an example master control device 205 communicating with a plurality of devices to monitor the power consumption of the plurality of devices, according to some embodiments. It is noted, however, that master control device 205 is provided solely for illustrative purposes, and is not limiting. Embodiments of this disclosure may be implemented using and/or may be part of device different from and/or in addition to master control device 205, as will be appreciated by persons skilled in the relevant art(s) based on the teachings contained herein. An example of master control device 205 shall now be described.

In some embodiments, master control device 205 can include a communication circuit 252, a controller 255, and a storage device 251. Master control device 205 can include or be implemented by an application running on a mobile phone. Master control device 205 can communicate with a device 201 and a device 203, which may be referred to as a node device. Device 201 or device 203 may be an example of device 100 illustrated and described in FIG. 1.

In some embodiments, device 201 may include functional circuit 211, power monitor circuit 213, a controller 215, and a communication circuit 212, all coupled to each other. In addition, device 201 can include a storage device 217 storing a power usage data 222 collected by power monitor circuit 213 of functional circuit 211. Device 203 may include functional circuit 231, power monitor circuit 233, a controller 235, and a communication circuit 232, all coupled to each other. In addition, device 203 can include a storage device 237 storing a power usage data 242 collected by power monitor circuit 233 of functional circuit 231. There can be other components, such as a timer, or other functions, not show for device 201 and device 203.

In some embodiments, device 201, device 203, and master control device 205 may be interconnected through a link 271 and a link 263 to form a network. The networking, communication and connectivity protocols used for device 201, device 203, and master control device 205 may be internet-enabled, and may implement various networking protocols, such as Constrained Application Protocol (CoAP), Datagram Transport Layer Security (DTLS), Message Queue Telemetry Transport (MQTT) protocol, Data Distribution Service (DDS™), and Advanced Message Queuing Protocol (AMQP). Other protocols, such as IPv6, Low Power Wide Area Network (LPWAN), Zigbee, Bluetooth Low Energy, Z-Wave, Radio-frequency identification (RFID), or near field communication (NFC) protocols may be implemented as well. In some embodiments, cellular, satellite, Wi-Fi and Ethernet network protocols may also be used.

In some embodiments, master control device 205 can receive power usage data 222 from device 201, where power usage data 222 are collected by power monitor circuit 213 based on a function performed by functional circuit of the device 201. Master control device 205 can receive power usage data 242 from device 203, where power usage data 242 are collected by power monitor circuit 233 based on a function performed by functional circuit of the device 203. Power usage data 222 may be received from device 201 periodically with a predetermined period, such as every 1 minute or every 10 microseconds. The predetermined period may be determined based on the application and the function device 201 is designed for. The accumulated power usage data 222 may be saved in storage device 251 to form historical data collected by device 201. Similarly, the accumulated power usage data 242 collected by power monitor circuit 233 of device 203 may be saved in storage device 251 to form historical data collected by device 203.

Based on the received power usage data, master control device 205 can generate an instruction 261 related to the function performed by functional circuit 211 of device 201, which can be stored in storage device 251, and transmit instruction 261 to device 201 to adjust the function performed by functional circuit 211 of device 201. Accordingly, the power consumption of device 201 may be adjusted based on the adjusted function performed by device 201. By receiving instruction 261 from master control device 205 instead of generating such instructions locally by device 201, device 201 can save more power, since instruction 261 may be received at a time when power usage data 222 is transmitted, without significant computation power in addition to the communication operations.

In some embodiments, master control device 205 can generate instruction 261 based on the received power usage data 222 and historical data collected by a plurality of devices that are stored in the master control device, such as power usage data 242 from device 203.

In some embodiments, master control device 205 can further detect a problem with device 201 based on the received power usage data 222 and the historical data collected by device 201 itself and/or by other devices such as device 203, which are stored in master control device 205.

In some embodiments, based on the received power usage data from the plurality of devices, such as power usage data 222 and/or power usage data 242, master control device 205 can perform statistical analysis, and further provide the statistical analysis to a user, so that the user can be aware of the details of the power consumption of individual devices, or the group of devices such as device 201 and device 203. In addition, master control device 205 can predict, based on the power usage data from the plurality of devices, future power usage by the plurality of devices. In some embodiments, master control device 205 can predict future power usage by the plurality of devices based on the statistical analysis for the received power usage data from the plurality of devices.

Figure 3:
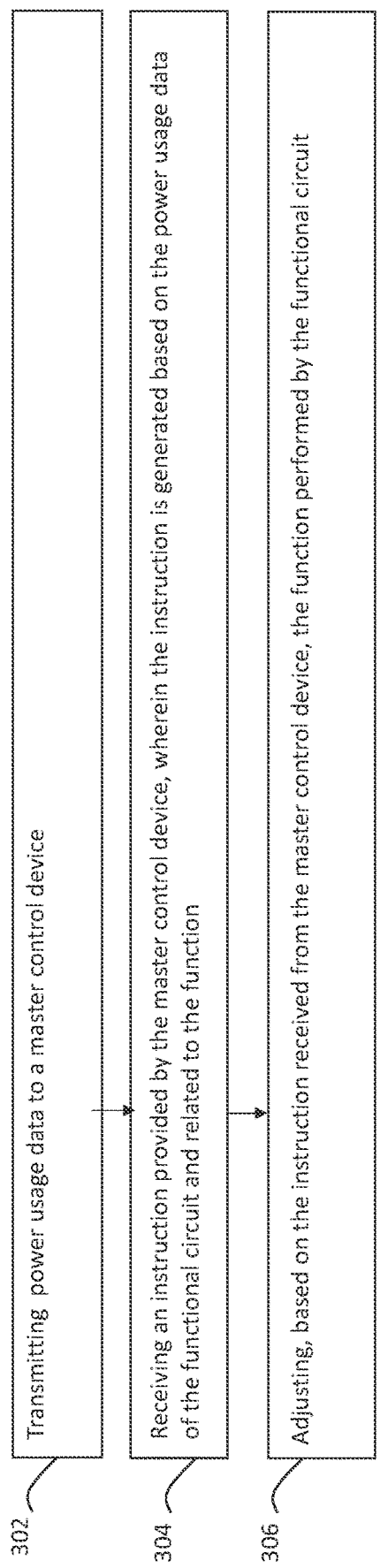
FIG. 3 illustrates an example process for a device to manage the power consumption of a functional circuit of the device based on power usage data collected by a power monitor circuit of the device, according to some embodiments.

FIG. 3 illustrates an example process 300 for a device to manage the power consumption of a functional circuit of the device based on power usage data collected by a power monitor circuit of the device, according to some embodiments. Processes 300 can be performed by processing logic of controller 105 or controller 215 that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

At 302, a controller can transmit the power usage data to a master control device. For example, as described for FIG. 2, controller 215 can transmit power usage data 222 to master control device 205. Power usage data 222 may be collected by power monitor circuit 213 for functional circuit 211 of device 201.

At 304, a controller can receive an instruction provided by the master control device, where the instruction is generated based on the power usage data of the functional circuit and related to the function. For example, as described for FIG. 2, controller 215 can receive instruction 261 provided by master control device 205, where instruction 261 is generated based on power usage data 222 of functional circuit 211 and related to the function performed by functional circuit 211.

At 306, a controller can adjust, based on the instruction received from the master control device, the function performed by the functional circuit. For example, as described for FIG. 2, controller 215 can adjust, based on instruction 261 received from master control device 205, the function performed by functional circuit 211.

Figure 4:
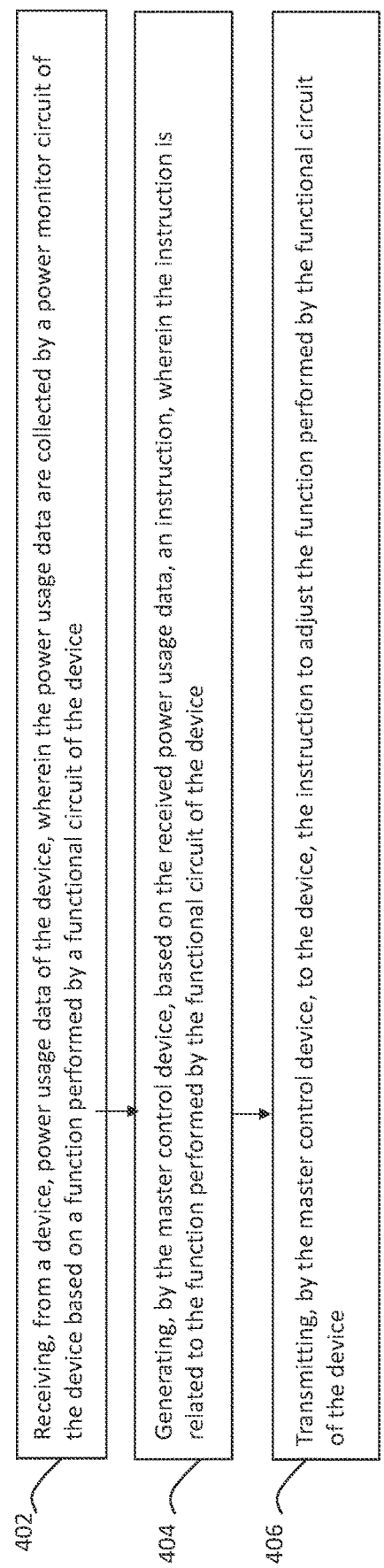
FIG. 4 illustrates an example process for a master control device to control a device to manage the power consumption of a functional circuit of the device based on power usage data collected by a power monitor circuit of the device, according to some embodiments.

FIG. 4 illustrates an example process 400 for a master control device to control a device to manage the power consumption of a functional circuit of the device based on power usage data collected by a power monitor circuit of the device, according to some embodiments. Processes 400 can be performed by processing logic of controller 255 that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

At 402, controller 255 can receive, from a device, power usage data of the device, where the power usage data are collected by a power monitor circuit of the device based on a function performed by a functional circuit of the device. For example, as described for FIG. 2, controller 255 can receive, from device 201, power usage data 222, where power usage data 222 are collected by power monitor circuit 213 based on a function performed by functional circuit 211.

At 404, controller 255 can generate, based on the received power usage data, an instruction related to the function performed by the functional circuit of the device. For example, as described for FIG. 2, controller 255 can generate, based on received power usage data 222, instruction 261 related to the function performed by functional circuit 211 of device 201.

At 406, controller 255 can transmit, to the device, the instruction to adjust the function performed by the functional circuit of the device. For example, controller 255 can transmit, to device 201, instruction 261 to adjust the function performed by functional circuit 211 of device 201.

Example Computer System

Figure 5:
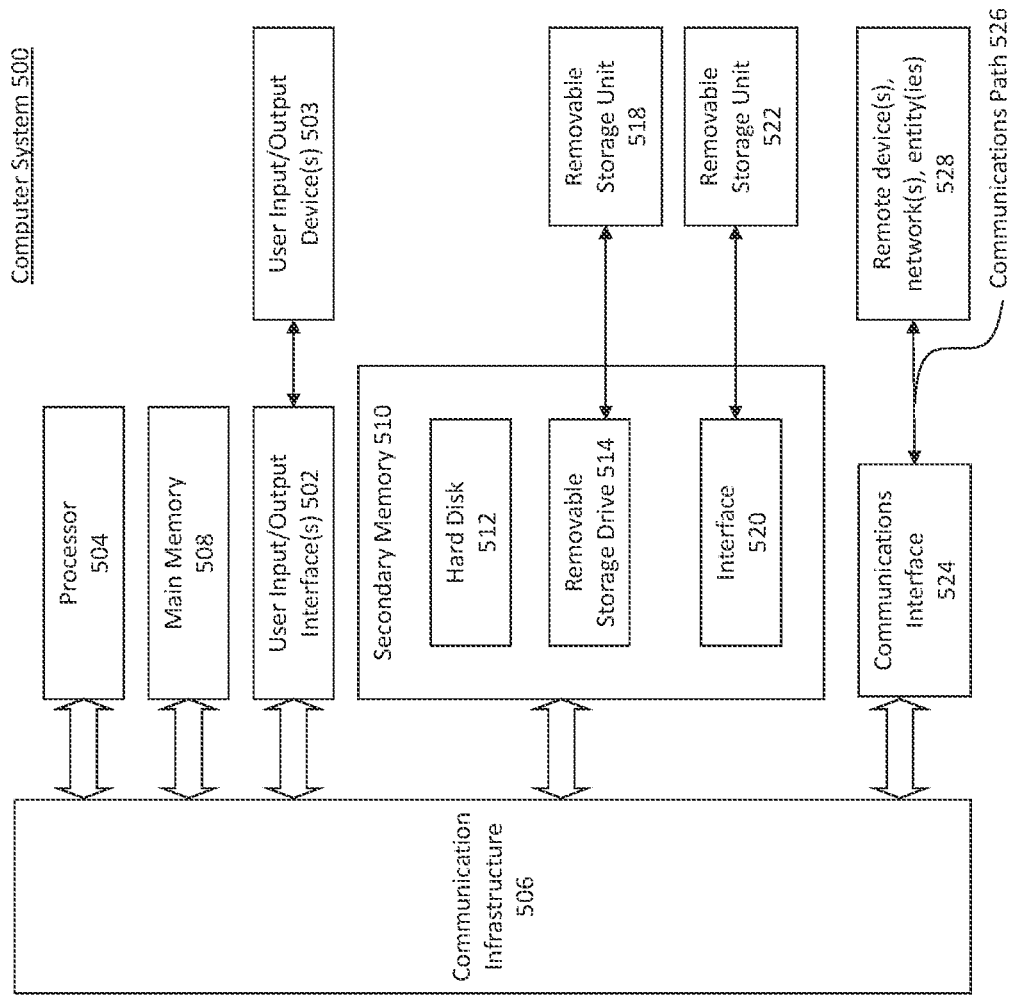
FIG. 5 illustrates an example computer system useful for implementing various embodiments.

Various embodiments may be implemented, for example, using one or more well-known computer systems, such as computer system 500 shown in FIG. 5. For example, device 100, device 201, device 203, and master control device 205, as shown in FIGS. 1 and 2, may be implemented using combinations or sub-combinations of computer system 500 to perform various functions described herein, e.g., by process 300 and process 400, as shown in FIGS. 3 and 4. Also or alternatively, one or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A device, comprising:
   a functional circuit configured to perform a function the device is designed to perform, and generate power usage data including a voltage or a current of the functional circuit;
   a power monitor circuit coupled to the functional circuit, and configured to collect the power usage data of the functional circuit that includes a voltage, a current, or a power parameter of the functional circuit that is different from a power metering data of the device including both the functional circuit and the power monitor circuit; and
   a controller coupled to the power monitor circuit and the functional circuit, and configured to:
      transmit the power usage data to a master control device;
      receive an instruction directly provided by the master control device to the device, wherein the instruction is generated based on the power usage data of the functional circuit and related to the function, and wherein the received instruction is configured to cause the device to adjust the function performed by the functional circuit; and
      instruct the functional circuit to perform the function adjusted based on the instruction by changing an intensity or a degree of the function performed by the functional circuit without turning off the functional circuit.

2. The device of claim 1, further comprising:
   a storage device accessible by the power monitor circuit and the controller; and wherein the controller is further configured to:
   store the power usage data on the storage device.

3. The device of claim 2, wherein the storage device stores a power profile of the functional circuit, and the power usage data is estimated based on the power profile.

4. The device of claim 1, further comprising:
   a timer to measure an amount of time the functional circuit performs the function; and wherein the power usage data is estimated based on the amount of time and a power profile of the functional circuit.

5. The device of claim 1, wherein the power monitor circuit is coupled to a hot line and a neutral line of the device.

6. The device of claim 1, further comprising:
   a communication circuit coupled to the controller, wherein the controller is configured to transmit the power usage data and receive the instruction through the communication circuit, and wherein the communication circuit and the power monitor circuit are located in a single chip.

7. The device of claim 1, wherein the functional circuit is configured to provide power to a light emitting diode (LED).

8. The device of claim 1, wherein the received instruction is to turn off the functional circuit, and the controller is further configured to turn off the functional circuit responsive to the received instruction.

9. A method performed by a master control device, comprising:
   receiving, from a device, power usage data of a functional circuit of the device, wherein the power usage data are collected by a power monitor circuit of the device based on a function performed by the functional circuit of the device, and the power usage data include a voltage, a current, or a power parameter of the functional circuit that is different from a power metering data of the device including both the functional circuit and the power monitor circuit;
   generating, by the master control device, based on the power usage data, an instruction, wherein the instruction is related to the function performed by the functional circuit of the device; and
   transmitting, by the master control device, directly to the device, the instruction to adjust the function performed by the functional circuit of the device by changing an intensity or a degree of the function performed by the functional circuit without turning off the functional circuit.

10. The method of claim 9, wherein the generating the instruction further comprises generating the instruction based on the power usage data and historical data collected by a plurality of devices that are stored in the master control device.

11. The method of claim 10, further comprising:
    detecting a problem with the device based on the power usage data and the historical data.

12. The method of claim 9, further comprising:
    receiving, by the master control device and from a plurality of devices, a plurality of power usage data, wherein the plurality of power usage data are collected by power monitor circuits of the plurality of devices;
    performing a statistical analysis, by the master control device, based on the power usage data from the plurality of devices; and
    providing the statistical analysis to a user.

13. The method of claim 12, further comprising:
predicting, based on the plurality of power usage data from the plurality of devices, future power usage by the plurality of devices.

14. The method of claim 9, wherein the receiving the power usage data from the device comprises receiving the power usage data from the device periodically with a predetermined period.

15. The method of claim 9, wherein the master control device includes a mobile phone, and the method is performed by an application operated on the mobile phone.

16. A non-transitory computer-readable medium having instructions stored thereon that, when executed by at least a computing device, cause the computing device to perform operations comprising:
receiving, from a device, power usage data of a functional circuit of the device, wherein the power usage data are collected by a power monitor circuit of the device based on a function performed by the functional circuit of the device, and the power usage data include a voltage, a current, or a power parameter of the functional circuit that is different from a power metering data of the device including both the functional circuit and the power monitor circuit;
generating, based on the power usage data, an instruction, wherein the instruction is related to the function performed by the functional circuit of the device; and
transmitting, directly to the device, the instruction to adjust the function performed by the functional circuit of the device by changing an intensity or a degree of the function performed without turning off the functional circuit.

17. The non-transitory computer-readable medium of claim 16, wherein the receiving the power usage data from the device comprises receiving the power usage data from the device periodically with a predetermined period.

18. The non-transitory computer-readable medium of claim 16, wherein the generating the instruction further comprises generating the instruction based on the power usage data and historical data collected by a plurality of devices that are stored in the computing device.

19. The non-transitory computer-readable medium of claim 18, the operations further comprising:
detecting a problem with the device based on the power usage data and the historical data.

20. The non-transitory computer-readable medium of claim 16, the operations further comprising:
receiving, from a plurality of devices, a plurality of power usage data, wherein the plurality of power usage data are collected by power monitor circuits of the plurality of devices;
performing a statistical analysis based on the power usage data from the plurality of devices; and
providing the statistical analysis to a user.

* * * * *